United States Patent [19]

Niki et al.

[11] Patent Number: 5,003,922

[45] Date of Patent: Apr. 2, 1991

[54] CAGE FOR SMALL EXPERIMENTAL ANIMALS

[76] Inventors: Motohiro Niki; Etsuko Niki, both of 2-22-11, Yushima, Bunkyo-Ku, Tokyo-To; Misako Kidachi; Atsushi Kidachi, both of 1-3-7, Mitsuji, Taito-Ku, Tokyo-To; Mieko Niki, 2-22-11, Yushima, Bunkyo-Ku, Tokyo-To, all of Japan; Kap J. Lee; Yun Lee, both of R.R.#1, Box 123, Grand Forks, N. Dak. 58201

[21] Appl. No.: 492,551

[22] Filed: Mar. 12, 1990

[51] Int. Cl.⁵ .............................................. A01K 1/00
[52] U.S. Cl. ..................................... 119/15; 119/72.5
[58] Field of Search ........................... 119/15, 17, 72.5

[56] References Cited

U.S. PATENT DOCUMENTS

| | | | |
|---|---|---|---|
| 1,903,767 | 4/1933 | Karst | 119/72.5 |
| 2,486,729 | 11/1949 | Beckley | 119/72.5 |
| 3,367,308 | 2/1968 | Quattrone et al. | 119/15 |
| 3,924,571 | 12/1975 | Holman | 119/15 |
| 4,346,672 | 8/1982 | Niki | 119/72.5 |
| 4,458,632 | 7/1984 | Niki | 119/15 |
| 4,593,650 | 6/1986 | Lattuada | 119/15 |
| 4,699,088 | 10/1987 | Murray et al. | 119/72.5 |
| 4,940,017 | 7/1990 | Niki et al. | 119/72.5 |

Primary Examiner—Paul J. Hirsch
Attorney, Agent, or Firm—Ladas & Parry

[57] ABSTRACT

A cage well suited for confining and rearing mice, rats and like relatively small animals in a germ free, hygienic atmosphere for experimentation purposes. Included is a boxlike casing with its open top closed by a horizontal lid. There are provided an air supply conduit for supplying germ free air into the casing, and an exhaust conduit for drawing air from within the casing, both extending into the casing through a side wall of the casing. The air supply conduit extends in parallel relation to the inner or lower surface of the lid and is formed with a series of air supply holes directed upwardly, so that supplied air flows upwardly against the lower surface of the lid and is then turned downwardly, whereby the supplied air does not impinge directly upon the animals, thus providing conditions favorable for the rearing of the animals.

6 Claims, 2 Drawing Sheets

CAGE FOR SMALL EXPERIMENTAL ANIMALS

BACKGROUND OF THE INVENTION

This invention relates to a cage for confining animals, particularly to a cage for experimental animals of smaller size such as mice and rats. More specifically, the invention deals with a hermetically sealed, ventilated cage suitable for confining and rearing relatively small experimental animals in a germ free, hygienically favorable environment. The cage in accordance with the invention may be used in such a manner that a multiplicity (e.g. tens or even hundreds) of such cages are arranged in columns and rows.

The laboratory animal cage has been known and used extensively which comprises a molded plastic casing or enclosure in the form of an open top box, with a wirework lid closing the open top of the casing for confining an experimental animal or animals. For feeding the confined animal, a water dispenser has been employed which has an elongated spout inserted in the casing through an opening formed in a side or end wall of the casing. U.S. Pat. No. 4,346,672 to Niki discloses an example of such water dispenser.

It has also been proposed to hermetically close the open top casing of the cage with a solid outer lid, which overlies a wirework inner lid, and to ventilate the interior of the casing with germ free air. The caged animals may be infected with germs. The air exhausted from within the cage may contain such germs. Should such air be allowed to fill the laboratory, the experimenters may be infected with the germs or may develop an allergy. It is therefore important that the cage be sealed hermetically and be ventilated so as not to contaminate the laboratory air.

Thus the ventilation system requires not only a conduit for supplying germ free air into the cage but also another conduit for exhausting the possibly contaminated air from within the cage. As these conduits are inserted in the cage through openings formed therein, the gaps between the conduits and the edges of the openings must be sealed against the escape of the contaminated cage air.

In a known ventilation system for the cage, an air supply conduit inserted into the cage is formed with a number of holes through which fresh air is supplied into the cage. In this type of ventilation system, fresh air supplied through the holes impinges directly upon small animals within the cage or causes relatively strong forced flows of air within the cage. This is not desirable for small animals raised in the cage for a long time.

SUMMARY OF THE INVENTION

It is an object of this invention to provide a cage for small experimental animals, having a ventilation system in which fresh air supplied does not impinge directly upon the animals and in which a soft stream of fresh air is produced within the cage whereby good raising conditions for the animals are maintained in the cage.

According to this invention, the above object is attained by a cage for small experimental animals comprising: enclosure means for confining an animal, including a casing and a substantially horizontal lid at the top of the casing, the casing having a side wall with an opening; an air supply conduit connected to an air supply source and passed through said opening to extend into the enclosure means, said conduit extending in a substantially parallel relation to the lower surface of the lid with a spacing between the conduit and the lid, said conduit having air supply holes formed in the conduit at intervals along the length of the conduit and directed upwardly to supply air flows against the lower surface of the lid; and means for exhausting air within the enclosure means.

The above and other objects, features and advantages of the invention and the manner of attaining them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
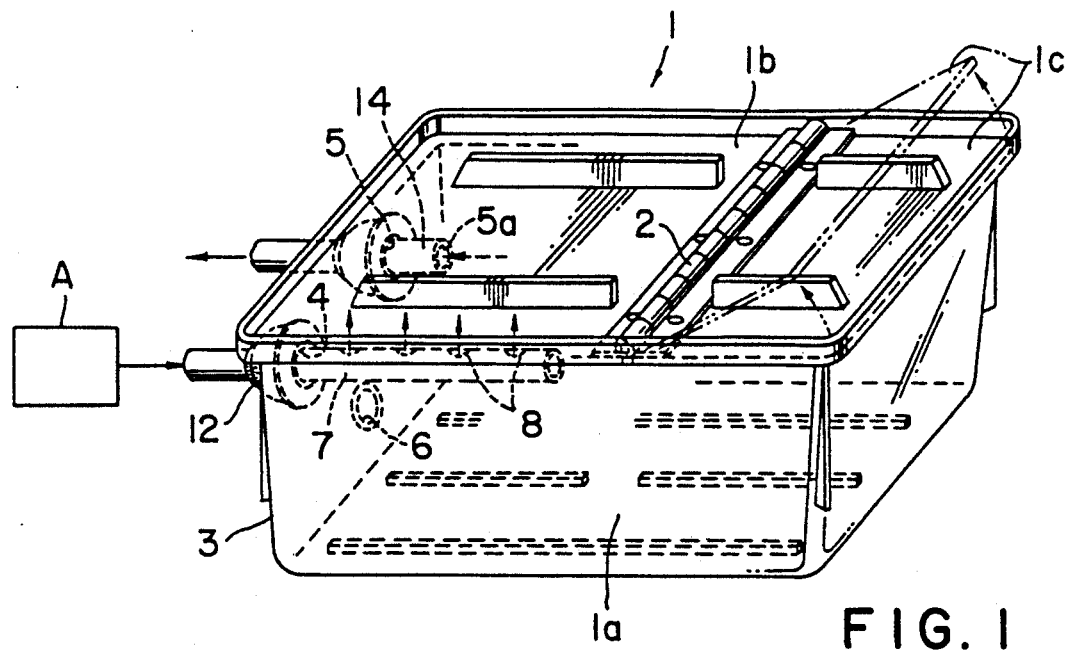
FIG. 1 is a perspective view of an experimental animal cage according to the invention.

Referring to FIG. 1, a cage 1 according to this invention shown therein is adapted for confining and feeding small experimental animals such as mice or rats. The cage 1 forming an enclosure has a casing 1a molded in the form of an open top box from a plastic, preferably a transparent plastic. The cage 1 further has a horizontal lid 1b removably fitted on the top of the casing 1a to hermetically close the open top of the casing. The lid 1b may also be made of a transparent plastic. The lid 1b may have a portion 1c that is hinged to the main part of the lid 1b so as to be swung upwardly about a hinge pin 2 as indicated by chain lines to open the cage 1.

Figure 2:
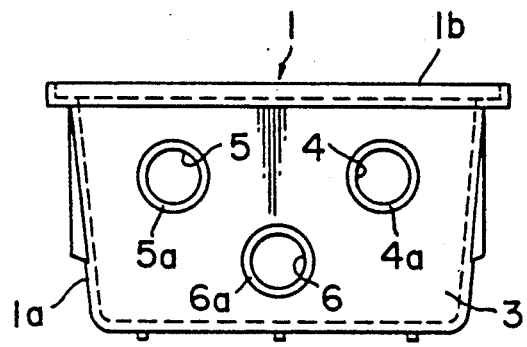
FIG. 2 is a left side view of the cage of FIG. 1, with an air supply and exhaust conduits and a water dispenser removed.

The casing 1a has a side wall 3 that is formed with two upper openings 4 and 5 and a lower openings 6, as shown in FIG. 2. These openings 4, 5 and 6 have respective reinforcing rings 4a, 5b and 6b that are snugly fitted in the openings.

Figure 3:
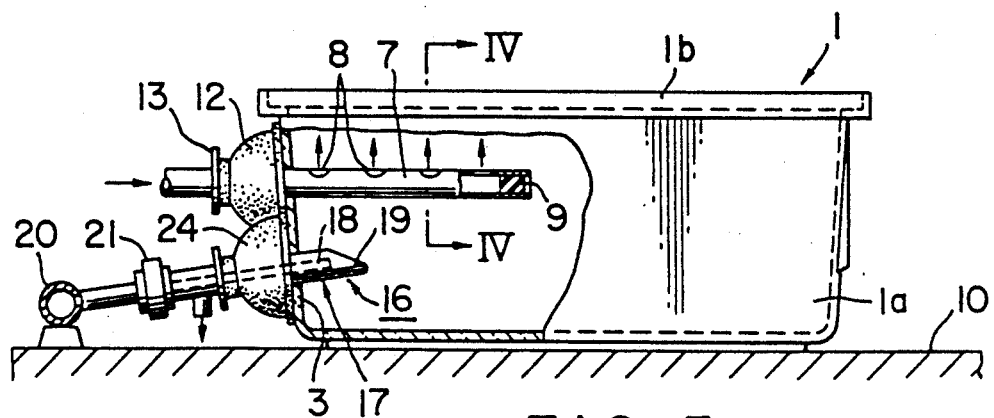
FIG. 3 is a front view, partly in vertical section, of the cage of FIG. 1.
Figure 4:
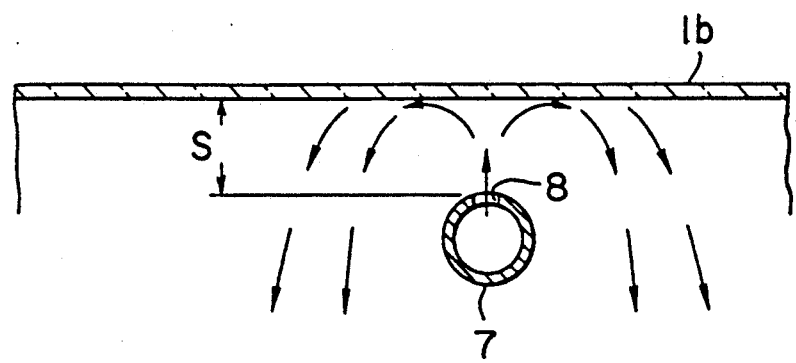
FIG. 4 is a section, on an enlarged scale, taken along the line IV—IV in FIG. 3.

As shown in FIG. 1, an air supply conduit 7 is passed through the opening 4 to be inserted into the interior of the cage 1. The air supply conduit 7 extends into the middle of the casing 1a and is communicatively connected to a source A of hygienic air. As also shown in FIG. 3, the air supply conduit 7 extends parallel to the inner surface of the lid 1b and has a series of air supply holes 8 formed in the upper side of the conduit 7. The distal open end of the conduit 7 is closed by a rubber plug 9 fitted snugly into the open end. As indicated in FIG. 4, the spacing S between the conduit 7 and the inner or lower surface of the lid 1b is maintained constant throughout the length of the conduit 7. The spacing S is preferably from 2 to 4 centimeters.

It has been found that a spacing S smaller than 2 centimeters produces a resistance to the upward air flows through the holes 8 and that a spacing S greater than 4 centimeters reduces the effect of producing uniformely spread, soft downward air flow within the cage 1.

The air supply conduit 7 extends horizontally from a stationary structure not shown so that the conduit 7 itself is also stationary, while the cage 1 is placed slidably on a table or shelf 10 (FIG. 3). For inserting the stationary conduit 7 in position within the cage 1, the cage 1 is placed on the shelf 10 with the side wall 3 spaced apart from the distal end of the conduit 7. The cage 1 is then moved slidingly toward the conduit 7 with the opening 4 fitted around the conduit 7 until the conduit 7 is fully inserted into the cage 1 as indicated in FIG. 3.

Figure 5:
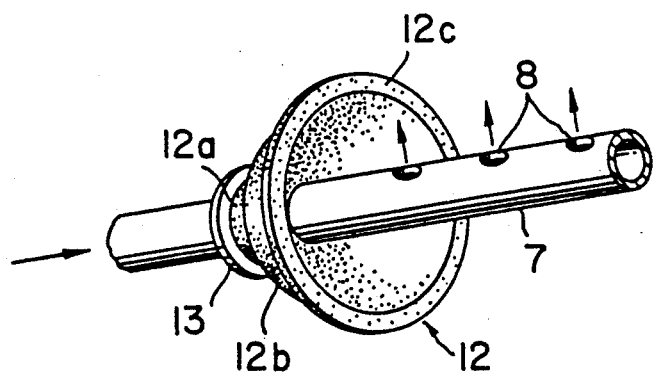
FIG. 5 is a fragmentary perspective view showing the air supply pipe and a connector cup.

As shown in FIG. 5, a connector cup 12 of rubber or like elastic material is fitted on the conduit 7. The connector cup 12 has a base end 12a fitted snugly but slidably on the conduit 7, and a cup body 12b with an annular flange 12c. The conduit 7 has a stop ring 13 fixed thereto. As the conduit 7 is inserted fully into the cage 1, the annular flange 12c of the connector cup 12 abuts and is held elastically against the side wall 3 as indicated in FIG. 3. Because the annular flange 12c of the connector cup 12 is of a greater diameter than the opening 4, the part of the side wall 3 through which the conduit 7 passes is hermetically sealed by the connector cup 12. When the cage 1 is slidingly moved away from the conduit 7, the conduit 7 can be withdrawn from within the cage 1.

In a similar way, an air exhaust conduit 14 is passed through the opening 5 as shown in FIG. 1. The exhaust conduit 14 extends a much shorter distance into the cage 1 and has an open end 5a. The exhaust conduit 14 also extends from a stationary structure so that the conduit 14 itself is also stationary. The insertion and withdrawal of the exhaust conduit 14 into and out of the cage 1 are carried out in a similar way to that described above, concurrently with the insertion and withdrawal of the supply conduit 7 by sliding the cage 1 on the shelf 10.

Figure 6:
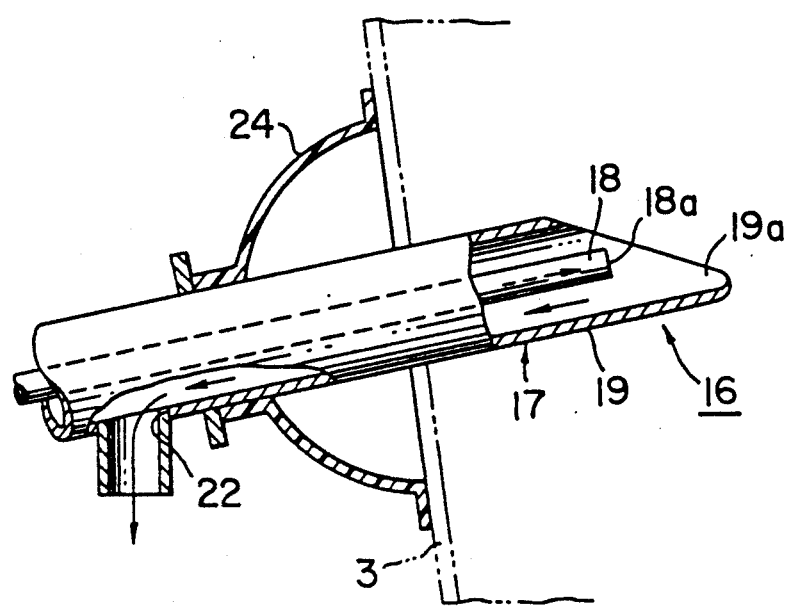
FIG. 6 is an enlarged side view, partly in vertical section, of the water dispenser.

The remaining lower hole 6 formed through the side wall 3 is used to pass a water dispenser 16 as indicated in FIG. 3. The water dispenser 16 has a spout 17 extending into the cage 1 obliquely upwardly. The water dispenser 16 can be generally of the type described in the previously cited Niki U.S. Pat. No. 4,346,672. As also shown in FIG. 6, the dispenser spout 17 comprises a supply tube 18 for conveying water to be dispensed, and a recovery tube 19 coaxially surrounding the supply tube 18 with an annular clearance therebetween. The supply tube 18 has a water exit end 18a, and the recovery tube 19 has a water recovery end 19a, which ends are both positioned within the cage 1. Water will be dispensed from the water exit end 18a of the supply tube 18 at a controlled rate as the caged animal thrusts its mouth at the supply tube end 18a.

The water exit end 18a of the supply tube 18 is recessed into the recovery tube 19, only to such an extent as to permit access and actuation by the caged animal. The supply tube 18 is connected to a stationary water tube 20 through a valve 21 which is opened when the water exit end 18a is touched by the caged animal and the supply tube 18 is swung within the recovery tube 19.

Thus, as the animal drinks water from the water exit end 18a of the supply tube 18, any water spilling therefrom will be mostly recovered by the recovery tube 19 and will flow by gravity through the space between supply tube 18 and recovery tube 19, instead of falling on the bottom of the cage 1. The recovery tube 19 has a discharge hole 22 for discharging the recovered water to the outside of the cage 1. The spilling of water onto the bottom of the cage 1 is undesirable because it wets the wood chips normally laid on the casing bottom and so seriously affects the health of the animal. Experiment has proved that the illustrated construction and oblique arrangement of the water dispenser 16 can drastically reduce water spilling taking place as the animal take sips therefrom.

Also in the case of the water dispenser 16, a connector cup 24 similar to the connector cup 12 is fitted over the recovery tube 19 and resiliently urged against the side wall 3 for sealing the part of insertion of the recovery tube 19 through the side wall 3.

In the use of a plurality or multiplicity of cages 1, each constructed as in the foregoing, in side by side arrangement, as many water dispensers 16 are coupled to the common fixed water tube 20. Further, as many air supply conduits 7 and air exhaust conduits 14 are coupled to a stationary, common air supply duct (not shown) and a stationary, common exhaust duct (not shown), respectively.

For the ventilation of the cage 1, germ free air is supplied into the cage 1 through the air supply holes 8 of the air supply conduit 7, and contaminated air within the cage 1 is withdrawn through the exhaust conduit 14. The contaminated air is filtered for removal of germs that may be contained in such air, prior to being exhausted to the atmosphere.

As indicated in FIGS. 3 and 4, air streams that flow out of the air supply conduit 7 through the holes 8 are directed upwardly against the lower surface of the lid 1b and then turned downwardly to flow toward the animals in the cage 1. This means that the air streams are prevented from impinging directly upon the animals but soft downward streams of the air are produced within the cage. Such soft downward streams of the air are distributed substantially uniformly in the cage because when the upward streams from the holes 8 impinge upon the lid 1b, they are caused to spread horizontally as indicated by arrows in FIG. 4. Such uniformly distributed soft air streams are favorable for the animals being reared in the cage.

What is claimed is:

1. A cage for confining and raising experimental animals, comprising:
    enclosure means for confining an animal, including a casing and a substantially horizontal lid at the top of the casing, the casing having a side wall with an opening;
    an air supply conduit connected to an air supply source and passed through said opening to extend into the enclosure means, said conduit extending in a substantially parallel relation to the lower surface of the lid with a spacing between the conduit and the lid, said conduit having upper and lower surfaces, said lower surface being continuous along its length and said upper surface having air supply holes formed in the conduit at intervals along the length of the conduit and directed upwardly to supply air flows against the lower surface of the lid; and
    means for exhausting air within the enclosure means.

2. The cage as claimed in claim 1, wherein said air supply conduit is closed at its distal end in the enclosure means with a plug.

3. The cage as claimed in claim 1, wherein said air supply holes are formed in a line in the highest surface portion of the air supply conduit.

4. The cage as claimed in claim 1, wherein said spacing is from 2 to 4 centimeters.

5. The cage as claimed in claim 1, wherein said means for exhausting air is an air exhaust conduit inserted into the enclosure means.

6. The cage as claimed in claim 1, further comprising a water dispenser inserted into the enclosure means.

* * * * *